(12) United States Patent
Lakeland et al.

(10) Patent No.: US 6,171,222 B1
(45) Date of Patent: Jan. 9, 2001

(54) ROLLS FOR METAL SHAPING

(75) Inventors: Kenneth Donald Lakeland, Mansfield; Graham Leonard Fraser Powell, Belair, both of (AU); Tommy Nylen, Styckebruk (SE)

(73) Assignee: Commonwealth Scientific Industrial Research Organisation, Campbell (AU)

( * ) Notice: Under 35 U.S.C. 154(b), the term of this patent shall be extended for 0 days.

(21) Appl. No.: 08/921,423

(22) Filed: Aug. 29, 1997

Related U.S. Application Data

(63) Continuation of application No. 08/351,435, filed as application No. PCT/AU93/00279 on Jun. 15, 1993.

(30) Foreign Application Priority Data

Jun. 19, 1992 (AU) .................................. PL3019

(51) Int. Cl.[7] .................................. B23P 15/00
(52) U.S. Cl. .................................. 492/54
(58) Field of Search .................................. 492/53, 54, 59; 164/448, 442; 72/225, 366, 236

(56) References Cited

U.S. PATENT DOCUMENTS

| | | |
|---|---|---|
| 1,493,191 | 5/1924 | Golyer . |
| 3,334,996 | 8/1967 | Foster . |
| 4,546,527 | 10/1985 | Fukuda et al. . |
| 4,562,892 * | 1/1986 | Ecer .................................. 175/371 |
| 4,638,847 | 1/1987 | Day . |
| 4,839,949 | 6/1989 | Sobue et al. . |
| 4,992,095 * | 2/1991 | Nate et al. .................................. 75/246 |
| 5,087,305 * | 2/1992 | Chang .................................. 148/410 |

FOREIGN PATENT DOCUMENTS

| | | |
|---|---|---|
| 82798/91 | 3/1992 | (AU) . |
| 38 14 433 | 11/1989 | (DE) . |
| 2301325 * | of 0000 | (FR) .................................. 164/448 |
| 1425638 | 12/1965 | (FR) . |
| 1244876 | 9/1971 | (GB) . |
| 025418 * | of 0000 | (JP) .................................. 164/448 |
| 031506A * | 2/1993 | (JP) .................................. 492/53 |
| 332112 | 1/1971 | (SE) . |
| 412290 | 10/1974 | (SU) . |
| 526471 | 9/1976 | (SU) . |

OTHER PUBLICATIONS

86–040186/06 Derwent Abstract Accession No. (Kubota KK) Dec. 24, 1985 (Abstract).*

Patent Abstracts of Japan, vol. 816, No. 383 (C–0974), Aug. 17, 1992, JP 04 124255 A (Kobe Steel Ltd; Others: 01), Apr. 24, 1992.

Aso et al., "Solidification Process of Eutectic Fe–Cr–C–B Alloys", (Translation) *Japan Foundryman Soc.*, vol. 10, Oct. 1991, pp. 46–54.

Powell et al., Structure Nucleation Growth and Morphology of Secondary Carbides in High Chromium and Ni–Cr White Cast Irons, *Journal of Materials Science*, 27 (1992), pp. 29–35.

Austrian Patent Office Search Report for R 94584/93, dated Jan. 20, 1994, PCT International Search Report for PCT/AU 93/00279, completed Oct. 26, 1993.

(List continued on next page.)

*Primary Examiner*—David P. Bryant
*Assistant Examiner*—Marc W. Butler
(74) *Attorney, Agent, or Firm*—Merchant & Gould P.C.

(57) ABSTRACT

Rolls for metal shaping have at least a peripheral surface of an iron-based Fe—B or Fe—B—C cast alloy having from 1 to 20 wt % chromium; from 0.5 to 3 wt % boron; up to 1.0 wt % carbon; or higher carbon if substantial amounts of strong carbide forming elements such as Mo, V, Ti, W and Nb are present; optional alloying additions including the Mo, V, Ti, W and Nb and also including Si, Al, Mn, Ni and Cu; and, apart from incidental impurities, a balance of Fe.

21 Claims, 2 Drawing Sheets

Figure 1:
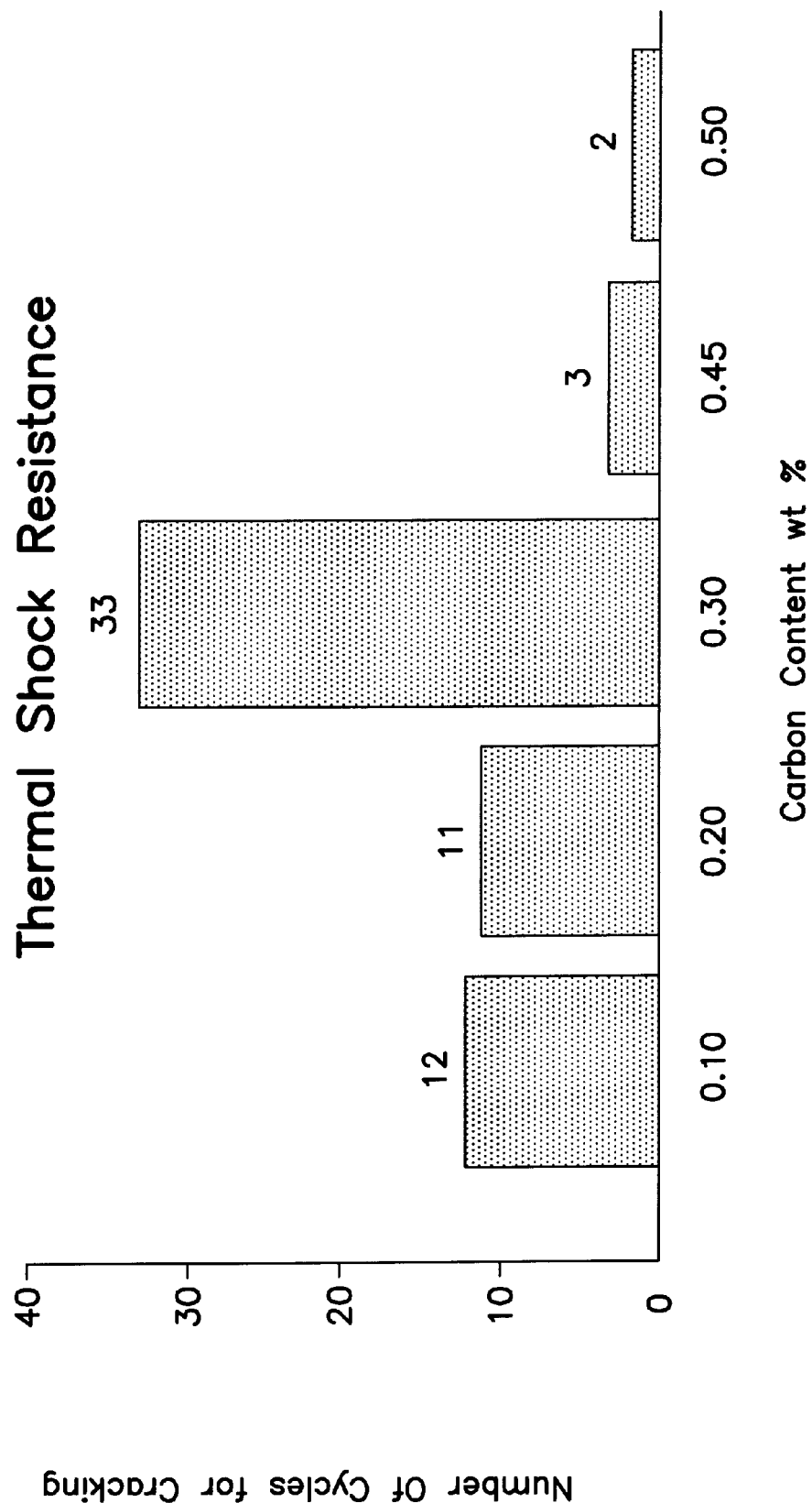

OTHER PUBLICATIONS 58006959 (Abstract); Japan.
92–212945/26 (Abstract); Japan.
60299441 (Abstract); May 8, 1987; Japan.
49106425 (Abstract); Oct. 9, 1974; Japan.
740857 (Abstract); Jun. 5, 1980; Russia.

* cited by examiner

ROLLS FOR METAL SHAPING

This is a Continuation of application Ser. No. 08/351,435, filed Dec. 15, 1994 abandoned Oct. 16, 1997.

This invention relates to improved rolls for metal shaping and to the manufacture of such rolls. The rolls of the invention have particular application in the hot rolling of metals, such as of steel. However, it is to be understood that the rolls of the invention also have application in the cold rolling of steel and other metals, and as continuous casting support rolls or thin strip caster work rolls.

Rolls, for the hot rolling of steel and other metals, can be made from a wide variety of cast irons, cast steels and forged steels. However, cast irons of the types considered below have generally been used.

In hot rolling, the temperature of feed material to be rolled may reach 1000° C. or more. The material of which the rolls are made must be hard enough to resist wear, strong enough to maintain dimensional shape and tough enough to resist cracking and fracture. The material also must have sufficient resistance to thermal shock in order to resist thermal cracking, usually referred to as "fire cracking".

Resistance to thermal shock is of paramount importance in hot rolling at the high temperatures that are met in the hot rolling of steel. The effect of such temperatures is particularly severe in the event of a rolling mill stalling or being stopped during a rolling pass, as the hot feed material then remains in contact with the stationary roll. With such contact, conventional cast rolls will usually suffer severe cracking, resulting in the need to remove the roll for re-machining or in the roll being scrapped.

Conventional alloy mottled cast irons, containing considerable amounts of both carbides and graphite, are generally used for the production of rolls for the rolling of hot metal, particularly long steel products such as billets, bars, sections, wires, rods and tubes. Typical of the mottled cast irons used are nodular and indefinite chill irons. The mottled cast irons are designed to combine a reasonable resistance to both wear and thermal fatigue (thermal shock). However, a compromise between these main properties is involved, since a change in the balance between carbides and graphite will inevitably lead to an improvement in one of the main properties at the expense of the other. Thus, for example, nodular cast irons with high carbide content and, hence, less graphite, will have enhanced surface hardness with superior resistance to wear, but will have inferior fire-crack resistance. One, generally undesired, property of rolls manufactured from mottled cast irons is that, because of the decrease in solidification rate from the surface into the depth of the roll, there is an associated decrease in hardness from the surface towards the centre of the roll.

Conventional chromium alloyed white cast irons are also generally used for the production of rolls for the rolling of hot metal, particularly flat steel products such as plate or strip. Typically these white irons have in excess of 15 wt % chromium, in excess of 2 wt % carbon, together with other alloying elements such as nickel, molybdenum, manganese and silicon. The white cast irons contain a substantial amount of a hard chromium-rich eutectic carbide phase, separated by a martensitic matrix in which further very fine alloy carbides may have been precipitated. The white cast irons are chosen because of their wear resistance, that is imparted by the chromium-rich carbides, the high strength martensitic matrix and strengthening of the matrix by fine carbide precipitates. This microstructure provides desirable high hardness, typically about HV500, and high resistance to wear in most wear situations. However, the white cast irons have poor thermal shock resistance. Thus chromium white cast iron rolls, for hot metal rolling products, fire-crack readily during hot rolling of steel. Chromium white cast irons do not normally exhibit a decrease in hardness from the surface into the depth of the roll.

The present invention is directed to providing improved ferrous alloy rolls, which have very high resistance to wear, and which also have high resistance to thermal shock, in particular to fire-crack formation.

The conventional materials for rolls for hot metal rolling are based on the Fe—C system. They are dependent upon the presence of carbon as carbides and graphite in the case of the mottled cast irons, and at least as chromium-rich carbides in the case of the chromium white cast irons. The present invention, in contrast, can be based on the Fe—C—B system, but more typically is based on the Fe—B system or the Fe—B—C system with carbon, if present, being at a low level, typically not in excess of 1.0 wt %. However if strong carbide forming elements, such as molybdenum, vanadium, titanium and niobium, are included in the alloy composition then the carbon level may be in excess of 1.0 wt % provided that the level of strong carbide forming elements is such that the excess carbon is bound by these elements in carbide or carbo-boride phases. The carbon content of the matrix would then remain low.

The fracture toughness, thermal shock resistance and wear resistance of the cast ferrous alloys is largely determined by the volume fraction of hard phases, which in turn is a function of the content of both boron and carbon and carbide and boride forming elements, and also the interstitial boron and carbon content of the matrix. The boron content of the matrix is always low because the solubility of boron in ferrite and austenite is low. However the solubility of carbon in austenite and therefore the carbon content of the martensitic matrix can be as high as approximately 2 wt % unless the carbon is bound in some other phase.

It is overriding in the design of satisfactory alloy compositions that the carbon content of the matrix is kept to a low enough level for sufficient fracture toughness or thermal shock resistance to be achieved for the application in question. For hot metal rolls the preferable level of carbon in the matrix is less than 0.3 wt % and can be significantly lower in some applications.

The present invention provides a roll for metal shaping, the roll having at least a peripheral surface layer of a sufficient thickness of an iron-base cast alloy having from 1 to 20 wt % chromium, from 0.5 to 3 wt % boron, up to 1.0 wt % carbon or higher if substantial amounts of strong carbide forming elements such as molybdenum, vanadium, titanium, tungsten and niobium are present, optional alloying additions as detailed in the following and, apart from incidental impurities, a balance of iron.

The roll of the invention is found to be suitable for the hot rolling of metals, such as steel. As a consequence of the required iron-base cast alloy present in at least a peripheral surface layer, but able to comprise substantially the entire roll body, the roll has both a very high resistance to wear and to thermal shock. However, the physical properties of the invention also render it suitable for the cold rolling of metals, such as flat and/or long products of for example steel, and for use as a continuous casting roller for a variety of metals.

The roll, in one form of the invention, is comprised substantially solely of such an iron-base cast alloy. That is, the roll may be of unitary, monolithic construction, and preferably produced in a single casting operation. However, in an alternative form, the roll may have an outer shell of the iron-base cast alloy, providing the sufficient surface layer, and a core of another ferrous alloy with which the shell is made integral.

The iron-base alloy can be substantially free of carbon, with carbon present effectively only as an incidental impurity. However, as indicated, carbon can be present at up to 1.0 wt %, or higher if substantial amounts of strong carbide forming elements such as molybdenum, vanadium, titanium, tungsten and niobium are present. Preferably carbon does not exceed 0.6 wt %, and may for example be present at from 0.1 to 0.6 wt %, such as from 0.1 to 0.3 wt %. The boron content preferably is not less than 0.5 wt %, and most preferably is from 0.5 to 2.5 wt %, such as from 1 to 2.5 wt %. For most applications, the preferred chromium content is from 3 to 18 wt %, such as from 8 to 18 wt %.

The iron-base alloy can contain sufficient alloying additions for enhancement of oxidation properties and hardenability. Suitable alloying elements for these purposes include silicon, aluminium, manganese, nickel, copper and molybdenum, either separately or in combination. Preferred additions for these purposes are of silicon at up to 3 wt % such as from 0.5 to 3 wt %, aluminium at up to 0.2 wt %, manganese at up to 2 wt % such as from 0.2 to 2 wt %, nickel at from 0.2 to 2 wt %, copper at up to 3 wt %, and/or molybdenum at up to 5 wt % such as from 0.5 to 5 wt %. Also silicon and/or aluminium may be present in a melt of the iron-base alloy, as this can be beneficial in keeping the melt in a de-oxidised condition.

The addition of molybdenum also increases hardness and improves resistance to softening at high temperatures, due to its action as a strong carbide and/or boride forming element. For the same purposes, sufficient amounts of other strong carbide forming and/or boride forming elements, such as vanadium, titanium, tungsten and/or niobium, can be added to the iron-base alloy. Preferred additions for enhancing resistance to softening are molybdenum as indicated above, vanadium at up to 8 wt %, titanium at up to 5 wt %, tungsten at up to 7 wt% and/or niobium at up to 6 wt %.

The iron-base alloy required for the present invention can be prepared as a melt for casting by melting suitable constituent materials in an electric induction furnace. This most preferably entails melting mild steel scrap, low carbon ferro-chromium and low carbon ferro-boron. Other commercial foundry alloys can be added to provide alloy additions required in the iron-base alloy. For re-melt charges, return scrap containing about 2 wt % boron can be readily melted with mild steel scrap and ferro-alloys, in which case the melt can be kept in a de-oxidised condition, if necessary, by the use of ferro-silicon or aluminium.

The iron-base alloys of the invention have a melting point close to 1300° C. In general, a melt pouring temperature of from 1400° C. to 1450° C. is desirable, depending on the nature of the casting.

Monolithic rolls according to the invention can be cast in vertical static moulds, or other, conventional methods suitable for casting metal rolls can be used to produce rolls according to the invention.

Where the rolls according to the invention are of composite form, having an outer shell of the iron-base alloy and a core of another ferrous alloy, the shell most preferably is produced first. For this, the shell is cast to the sufficient thickness in a vertical or horizontal centrifugal casting machine, and then used as a mould component for casting the core. Another method of producing a composite roll as indicated above is the static compound process.

The core for a composite roll most preferably is ductile, such as of a high carbon iron or steel, or a low chromium iron base alloy. However, it can be desirable to provide an intermediate layer between the shell and the core, to ensure bonding of a high level of integrity between the shell and the core and, to a degree, a less pronounced transition in physical properties between the shell and the core. For this purpose, an intermediate layer of a low carbon steel is used, such as a low carbon stainless steel having at least 12 wt % Cr. Thus, a quantity of the low carbon steel is cast within the shell to achieve a required thickness, again using a vertical or horizontal centrifugal casting machine, after which the high carbon iron or steel for the core is poured into the spinning mould of the machine.

The shell generally is at least 25 mm thick, depending on the application for the roll, such as from 25 to 75 mm thick. The intermediate layer, in general, will be at least 10 mm thick, but need not be significantly in excess of 25 mm thick. However, depending on the radius of a given composite roll, the intermediate layer could range up to 35 mm in thickness or higher, such as up to 50 mm thick. The minimum shell thickness for a given roll, in general, will be dependent upon the radius of the roll, and also its intended use. However, the shell generally need not exceed about 45 mm in thickness, although larger thicknesses can be provided if required, and can be desirable for very large rolls. Most preferably, the shell has a thickness of from 30 to 45 mm.

In a composite roll according to the invention, the low carbon steel intermediate layer provides a buffer layer between the shell and the core. The intermediate layer achieves a strong interface between the hard iron-base alloy of the shell and the ductile high carbon iron or steel core. The intermediate layer achieves bonding at each interface, typically with a degree of alloying in the vicinity of each interface. However, it prevents alloying between the iron-base alloy and the metal of the core such as could result in the formation of a high carbon boro-carbide eutectic that could crack on cooling and/or on exposure to thermal cycling.

As indicated, an intermediate layer as described is desirable where the core is of a high carbon iron or steel. However, as indicated earlier, the core can be a ferrous alloy of relatively low chromium content. In that alternative, it is less necessary that an intermediate layer be used, since the ferrous alloy is found to achieve direct bonding with the shell to a high level of integrity. A suitable ferrous alloy for achieving direct bonding without recourse to an intermediate layer is one having not more, and preferably less, than 0.6 wt % carbon; from 1 to 8 wt %, such as from 1 to 5 wt %, chromium; and from 1 to 2 wt % boron.

The iron-base alloy required by the invention is weldable. Thus, in addition to the rolls of the invention having good mechanical properties, including hardness and wear resistance, and high resistance to thermal shock, the rolls are also able to be repaired. That is, worn rolls can be built-up by welding, using a welding electrode of the iron-base alloy, and then machined, or re-machined. A worn roll can initially be machined to remove any defects, and welded and machined to enable it to be used for further service in a rolling mill, a procedure not possible with either normal high carbon chromium white iron rolls or mottled iron rolls.

Figure 2:
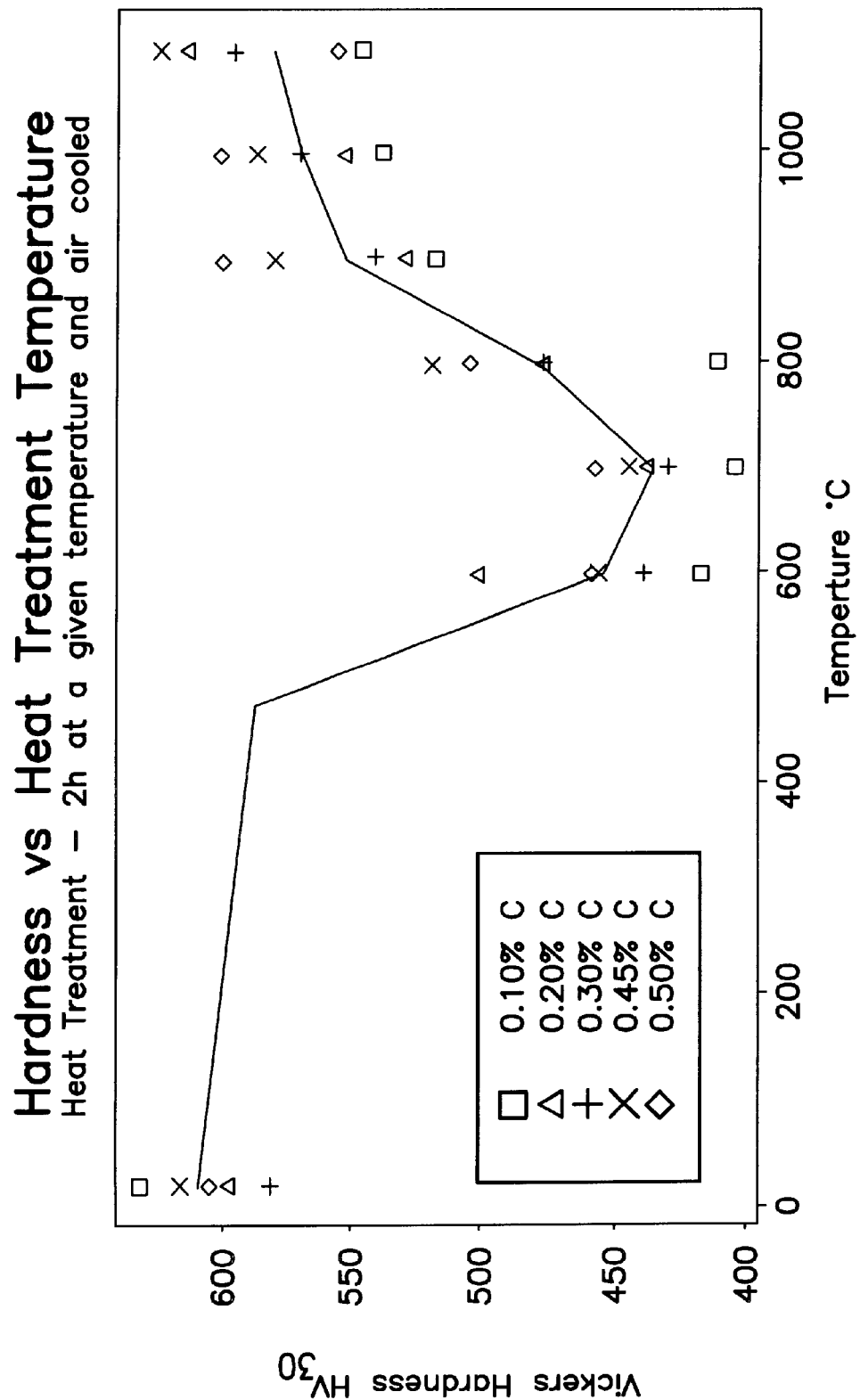

The invention will now be further described with reference to the following Examples, and to the accompanying drawings. In the drawings:

FIG. 1 illustrates thermal shock resistance, showing a graph of the number of cycles for cracking with rolls according to the invention against carbon content; and FIG. 2 shows typical variation in hardness of rolls according to the invention after heat treatment for two hours at various temperatures, followed by air cooling.

EXAMPLE 1

Castings of iron-base alloys as required by the present invention were made and tested for mechanical properties and resistance to thermal shock. The base composition was 17 wt % Cr, 2 wt % B, 1.5 wt % Ni, 1.0 wt% Si, 1.0 wt % Mn, 0.5 wt % Mo, with carbon contents varying between 0.1 to 0.5 wt % and the balance (apart from incidental impurities) of iron. The chemical analyses of individual castings are detailed in Table 1, while mechanical properties are shown in Table 2.

Testing of the castings for thermal shock resistance was performed by alternately heating the castings to 900° C. for 30 minutes, followed by quenching in water to ambient temperature. The number of cycles required to produce a single 2 mm crack on the casting surface was determined.

The results are summarised in FIG. 1 and, while this showed the alloy with 0.3 wt % carbon to produce the best result, this is not based on any optimised overall composition.

The same thermal shock testing applied to a white cast iron containing 2.5 wt % carbon and 16 wt % chromium resulted in severe cracking within a few cycles. The thermal shock resistance of the iron-base alloys of the invention is far superior to high carbon-chromium white cast irons and this is illustrated by the fact that the alloys of the invention can be joined by arc welding to mild steel without preheat and without cracking of the iron-base alloy or the weld. This is not possible with high carbon chromium white cast iron or any other carbide-rich roll material.

TABLE 1

Chemical Compositions of Experimental Alloys (Example 1) (wt %)

| Alloy No. | 1 | 2 | 3 | 4 | 5 |
|---|---|---|---|---|---|
| Carbon | 0.11 | 0.19 | 0.29 | 0.44 | 0.51 |
| Silicon | 1.28 | 1.16 | 1.02 | 0.96 | 0.82 |
| Manganese | 1.00 | 1.03 | 0.96 | 1.02 | 0.64 |
| Sulphur | <.02 | <.02 | <.02 | <.02 | <.02 |
| Phosphorus | <.02 | <.02 | <.02 | <.02 | <.02 |
| Chromium | 16.9 | 16.3 | 16.7 | 16.5 | 16.6 |
| Molybdenum | 0.45 | 0.44 | 0.42 | 0.41 | 0.44 |
| Nickel | 1.60 | 1.60 | 1.40 | 1.50 | 1.50 |
| Copper | 0.16 | 0.16 | 0.18 | 0.33 | 0.11 |
| Aluminium | 0.05 | 0.03 | 0.03 | 0.04 | 0.06 |
| Boron | 1.86 | 1.88 | 1.63 | 1.77 | 1.86 |

The heat treatment response is shown in FIG. 2 where the hardnesses of specimens heat treated for two hours at various temperatures, and air cooled are shown. It can be seen that the iron-base alloys can be softened for machining by heat treating in the range 600–700° C. and then rehardened by normalising. Dilatometer tests for the 0.1 wt % C, 0.2 wt % C and 0.5 wt % C alloys show that the alloys transform to martensite at cooling rates of 100° C./hr. The martensite start (Ms) transformation temperatures are 312° C., 340° C., and 380° C. for the 0.1 wt % C, 0.2 wt % C and 0.5 wt % C alloys,- respectively.

Considering the mechanical properties, the lower carbon alloys have the better strengths and fracture toughnesses and have adequate hardness. Alloys with carbon levels from 0.1 wt % to 0.3 wt % provide the best combination of mechanical properties and thermal shock resistance (see FIG. 3). As the carbon level is increased to 0.5 wt %, most of the mechanical properties decrease gradually but the resistance to thermal shock decreases dramatically.

EXAMPLE 2

Trial rolls according to the invention were produced and tested in an application for the hot rolling of light section products. The base composition was 0.2 wt % C, 16 wt % Cr, 2 wt % B, 0.5 wt % Si, 0.2 wt % Mn, 1.1 wt % Ni and 0.4 wt % Mo. The rolls were used in the last finishing stand for the rolling of stainless steel angles (50×50 mm) and the size of the roll was 445 mm diameter×700 mm barrel length with a weight of 1300 kg.

The present roll grade that is conventionally used for the same application is bainitic nodular iron rolls with a surface hardness of approximately 440 $HV_{30}$. Severe wear and fire-crack problems are normally experienced with conventional roll grades limiting the rolling campaign to 50–60 bars per groove.

The trial rolls of the invented alloy showed under similar rolling conditions insignificant groove wear after 100 bars and there was no sign of any fire-cracks. These rolls did not show any hardness drop within the used roll diameter.

EXAMPLE 3

Trial rolls according to the invention were produced and tested in an application for the hot rolling of light section products. The base composition was 0.3 wt % C, 16 wt % Cr, 1.8 wt % B, 0.5 wt % Si. The rolls were used in the last finishing stand for the rolling of carbon steel reinforcing bars (Φ=16 mm). The size of the rolls were 342 mm diameter× 500 mm barrel length.

The conventional alloy grade for this type of application is bainitic nodular iron with a hardness of around 560 $HV_{30}$. Loss of roll profile due to excessive wear in combination with fire-cracking is normally experienced and limits rolling campaigns with the conventional roll material.

The trial rolls exhibited only fifty percent of the wear that is normally experienced with bainitic nodular iron rolls. Under similar rolling conditions no fire cracking occurred with the trial rolls. The hardness of the rolls was approximately 560 $HV_{30}$ with no hardness drop within used diameters. The rolls were used in the as-cast condition.

TABLE 2

Mechanical Properties of Experimental Alloys (Example 1)

| Alloy | 1 | | 2 | | 3 | | 4 | | 5 | |
|---|---|---|---|---|---|---|---|---|---|---|
| Carbon Level | 0.1 | | 0.2 | | 0.3 | | 0.45 | | 0.5 | |
| Condition | As Cast | H.T. 2 h at 1000° C. | As Cast | H.T. 2 h at 1000° C. | As Cast | H.T. 2 h at 1000° C. | As Cast | H.T. 2 h at 1000° C. | As Cast | H.T. 2 h at 1000° C. |
| Ultimate Tensile Strength (MPa) | 543 | 649 | 550 | 724 | 472 | 614 | 388 | 583 | 435 | 555 |
| Elongation (%) | 0.17 | 0.24 | 0.28 | 0.44 | 0.44 | 0.24 | 0.24 | 0.25 | 0.28 | 0.22 |
| Modulus of Elasticity (GPa) | 238* | — | — | — | — | — | — | — | — | — |
| Transverse Rupture Stress (MPa) | 1205 | 1427 | 900 | 1248 | 834 | 1104 | 492 | 996 | 554 | 917 |
| Vickers Hardness (HV30 on 27 mm bars) | 615 | 572 | 639 | 635 | 646 | 648 | 675 | 670 | 717 | 691 |
| Fracture Toughness $K_q$ (MPa.m 1/2) | 27 | 35 | 24 | 29 | 32 | 29 | 26 | 25 | 20 | 21 |

*Determined by vibrational analysis (PUCOT)

EXAMPLE 4

Trial rolls according to the invention were produced and tested in an application for the hot rolling of light section products. The base composition was 0.25 wt % C, 17 wt % Cr, 1.8 wt % B, 0.5 wt % Si. The rolls were used as top rolls in the first two roughing stands for rolling of reinforcing bars (Φ=16 mm). The size of the rolls was 450 mm diameter×750 mm barrel length.

The conventional grade for this type of application is soft pearlitic/bainitic nodular iron with a hardness of approximately 350 $HV_{30}$. The compromise between fire crack resistance and wear resistance for this application leads to inferior wear properties for the conventional grades used.

The trial rolls showed after a normal campaign of 4 weeks very limited fire crazing and approximately 50% of normal wear. The rolls were given a special heat treatment prior to use giving them a hardness of around 450 $HV_{30}$. No hardness drop was recorded within used diameters.

SUMMARY

In summary, the invention provides rolls for metal shaping, for example for rolling or casting of metals such as steel, the roll having at least a peripheral surface layer of a sufficient thickness of an iron-base cast alloy having from 1 to 20 wt % chromium, from 0.5 to 3 wt % boron, up to 1.0 wt % carbon or higher if substantial amounts of strong carbide forming elements such as molybdenum, vanadium, titanium, tungsten and niobium are present, optional alloying additions, a nd a balance apart from incidental impurities of iron.

In one form, the roll is substantially comprised solely of the iron-base alloy, such as to be substantially of unitary, monolithic construction, such as produced in a single casting operation.

In an alternative form, the roll has an outer shell of the iron-base alloy, providing the layer of a sufficient thickness, and a ferrous core with which the shell is made integral by centrifugal casting. The core may be ductile and comprise a high carbon iron or steel. In one arrangement, there is an intermediate ferrous layer between the shell and the core which provides bonding therebetween. The intermediate ferrous layer may be a low carbon steel, such as a low carbon stainless steel having at least 12 wt % chromium. The intermediate layer preferably is from 10 to 50 mm thick, such as from 10 to 35 mm thick.

In a second arrangement for the alternative form of the roll, the core is of a ferrous alloy, such as one having up to but preferably less than 0.6 wt % carbon, from 1 to 8 wt % chromium and from 1 to 2 wt % boron, with the core being made integral with said shell, without provision of an intermediate layer therebetween.

The shell, where provided, may have a thickness of at least 25 mm thick, such as up to 75 mm, for example from 35 to 45 mm.

The invention also provides a method of producing a cast roll, for metal shaping, for example for rolling or casting of metals such as steel and having good resistance to thermal cracking. The method comprises forming the roll by a casting operation or by casting operations in which a melt of an iron-base alloy is cast to provide at least a peripheral surface layer for the roll which is of a sufficient thickness, the iron-base alloy having from 1 to 20 wt % chromium, from 0.5 to 3 wt % boron, up to 1.0 wt % carbon or higher if substantial amounts of strong carbide forming elements such as molybdenum, vanadium, titanium, tungsten and niobium are present, optional alloying additions, and a balance apart from incidental impurities of iron.

In one form of the method, the melt of the iron-base alloy is cast such that said roll is substantially comprised solely of said alloy, such as to be substantially of unitary, monolithic construction produced, for example, in a single casting operation.

In an alternative form of the method, the melt of the iron-base alloy is cast to form an outer shell of the roll providing the sufficient thickness, with substantially the remainder of the roll comprising a core cast of ferrous alloy such that the shell and core are made integral by centrifugal casting. In one arrangement, the melt of the iron-base alloy is cast to form the shell, after which a melt to provide the core is cast within the shell. A melt of a low carbon iron or steel such as a low carbon stainless steel having at least 12 wt % chromium, may be cast to form an intermediate layer between said shell and said core and to provide bonding therebetween.

In the method, the roll most preferably is cast in a centrifugal casting machine.

Finally, it is to be understood that various alterations, modifications and/or additions may be introduced into the constructions and arrangements of parts previously described without departing from the spirit or ambit of the invention.

We claim:

1. A roll, for the hot rolling or casting of steel products, wherein the roll has at least a peripheral surface layer, of not less than 25 mm thick, cast from an iron-base alloy, and wherein said iron-base alloy consists essentially of from 8 to 18 wt % chromium, 0.5 to 2.5 wt % boron, 0 to 0.3 wt % carbon, and a balance apart from incidental impurities of iron, wherein said cast iron-base alloy exhibits a high level of thermal shock resistance and wear resistance enabling extended use of the roll in hot rolling of steel products.

2. A roll according to claim 1, wherein said roll is substantially comprised solely of said iron-base alloy, such as to be substantially of unitary, monolithic construction, such as produced in a single casting operation.

3. A roll according to claim 1, wherein the roll has an outer shell of the iron-base alloy, providing said layer of a sufficient thickness, and a ferrous core with which the shell is made integral by either centrifugal casting or a static compound casting method.

4. A roll according to claim 3, wherein said core is ductile and comprises a high carbon iron or steel.

5. A roll according to claim 3, wherein there is an intermediate ferrous layer between the shell and the core which provides bonding therebetween.

6. A roll according to claim 5, wherein the intermediate ferrous layer is a low carbon steel, such as a low carbon stainless steel having at least 12 wt % chromium.

7. A roll according to claim 5, wherein said intermediate layer is from 10 to 50 mm thick, such as from 10 to 35 mm thick.

8. A roll according to claim 3, wherein said core is of a ferrous alloy, such as one having from 1 to 8 wt % chromium and from 1 to 2 wt % boron, said core being made integral with said shell such as without provision of an intermediate layer therebetween.

9. A roll according to claim 3, wherein said shell has a thickness of up to 75 mm, for example from 35 to 45 mm.

10. A roll, for the hot rolling or casting of steel products, wherein the roll has at least a peripheral surface layer, of not less than 25 mm thick, cast from an iron base alloy consisting essentially of from 8 to 18 wt % chromium, 0.5 to 2.5 wt % boron, 0 to 0.6 wt % carbon, at least one of nickel and molybdenum, and a balance apart from incidental impurities of iron, wherein the level of nickel where present is from 0.2 to 2 wt % and the level of molybdenum where present is from 0.5 to 5 wt %, wherein said cast iron-base alloy exhibits a high level of thermal shock resistance and wear resistance enabling extended use of the roll in hot rolling of steel products.

11. A roll according to claim 10, wherein said roll is substantially comprised solely of said iron-base alloy, such as to be substantially of unitary, monolithic construction, such as produced in a single casting operation.

12. A roll according to claim 10, wherein the roll has an outer shell of the iron-base alloy, providing said layer of a sufficient thickness, and a ferrous core with which the shell is made integral by either centrifugal casting or a static compound casting method.

13. A roll according to claim 10, wherein there is an intermediate ferrous layer between the shell and the core which provides bonding therebetween.

14. A roll, for the hot rolling or casting of steel products, wherein the roll has at least a peripheral surface layer, of not less than 25 mm thick, cast from an iron-base alloy consisting essentially of from 8 to 18 wt % chromium 0.5 to 2.5 wt % boron, 0 to 0.6 wt % carbon, at least one alloying element addition for enhancement of oxidation resistance and hardenability, and a balance apart from incidental impurities of iron, and wherein said at least one alloying element addition is selected from:

aluminium at up to 0.2 wt %, copper at up to 3 wt %, manganese at from 0.2 to 2 wt %, nickel at from 0.2 to 2 wt %, molybdenum at from 0.5 to 5 wt %, and silicon at from 0.5 to 3 wt %, wherein said cast iron-base alloy, in addition to exhibiting oxidation resistance and hardenability enabling extended use in hot rolling of steel products, exhibits a high level of thermal shock resistance and wear resistance enabling extended use of the roll in hot rolling of steel products.

15. A roll according to claim 14, wherein said roll is substantially comprised solely of said iron-base alloy, such as to be substantially of unitary, monolithic construction, such as produced in a single casting operation.

16. A roll according to claim 14, wherein the roll has an outer shell of the iron-base alloy, providing said layer of a sufficient thickness, and a ferrous core with which the shell is made integral by either centrifugal casting or a static compound casting method.

17. A roll according to claim 14, wherein there is an intermediate ferrous layer between the shell and the core which provides bonding therebetween.

18. A roll, for the hot rolling or casting of steel products, wherein the roll has at least a peripheral surface layer, of not less than 25 mm thick, cast from an iron-base alloy consisting essentially of from 8 to 18 wt % chromium, 0.5 to 2.5 wt % boron, 0 to 0.6 wt % carbon, at least one alloying addition forming intermetallic particles selected from carbide, boride and carbo-boride for wear resistance enhancement, and a balance apart from incidental impurities of iron, and wherein said at least one alloying addition is selected from:

molybdenum at up to 5 wt %, niobium at up to 6 wt %, titanium at up to 5 wt %, vanadium at up to 8 wt %, and tungsten at up to 7 wt %, wherein said cast iron-base alloy, in addition to exhibiting enhanced wear resistance enabling extended use in hot rolling of steel products, exhibits a high level of thermal shock resistance and wear resistance enabling extended use of the roll in hot rolling of steel products.

19. A roll according to claim 18 wherein said roll is substantially comprised solely of said iron-base alloy, such as to be substantially of unitary, monolithic construction, such as produced in a single casting operation.

20. A roll according to claim 18, wherein the roll has an outer shell of the iron-base alloy, providing said layer of a sufficient thickness, and a ferrous core with which the shell is made integral by either centrifugal casting or a static compound casting method.

21. A roll according to claim 18, wherein there is an intermediate ferrous layer between the shell and the core which provides bonding therebetween.

* * * * *